No. 873,574. PATENTED DEC. 10, 1907.
A. R. MARSTELLER.
MOLDING PROCESS.
APPLICATION FILED MAR. 30, 1907.

2 SHEETS—SHEET 1.

Witnesses
J. E. Camburn
Myron H. Clear

Inventor,
Aaron R. Marsteller
by
C. L. Parker
Attorney.

No. 873,574. PATENTED DEC. 10, 1907.
A. R. MARSTELLER.
MOLDING PROCESS.
APPLICATION FILED MAR. 30, 1907.

2 SHEETS—SHEET 2.

Witnesses,
N. E. Cambury.
Myron F. Clear

Inventor
Aaron R. Marsteller,
by
C. L. Parker
Attorney.

UNITED STATES PATENT OFFICE.

AARON R. MARSTELLER, OF ST. LOUIS, MISSOURI, ASSIGNOR OF ONE-THIRD TO DELIA MARSTELLER, OF ST. LOUIS, MISSOURI.

MOLDING PROCESS.

No. 873,574.  Specification of Letters Patent.  Patented Dec. 10, 1907.

Original application filed December 10, 1906, Serial No. 347,151. Divided and this application filed March 30, 1907. Serial No. 365,449.

*To all whom it may concern:*

Be it known that I, AARON R. MARSTELLER, a citizen of the United States, residing at St. Louis, in the county of St. Louis and State of Missouri, have invented certain new and useful Improvements in Molding Processes, of which the following is a specification.

This invention relates to molding processes, and has particular reference to a molding process such as is shown and described in my co-pending application filed December 10th, 1906, and serially numbered 347,151, of which the present application is a division.

Figure 6:
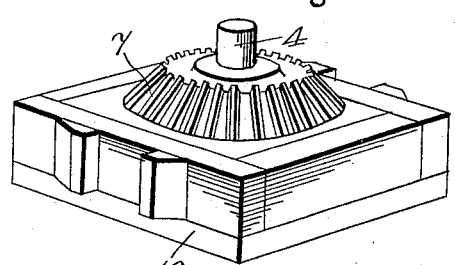
Figure 7:
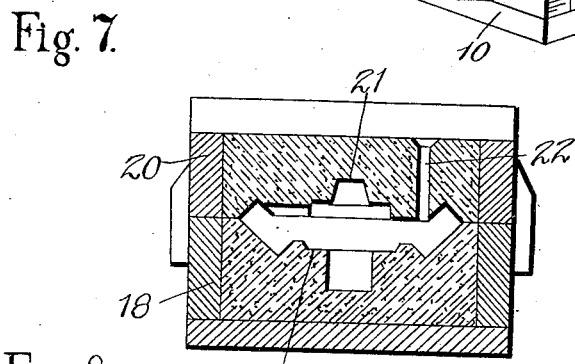
Figure 8:
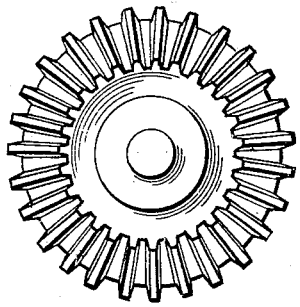
Figure 9:
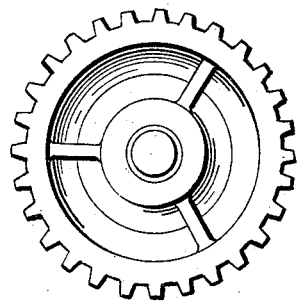

The invention resides in the features hereinafter described and pointed out in the accompanying drawings, in which, Figures 1, 2, 3, 4, 5, 6 and 7 are views illustrating the method of carrying out the process which constitutes my invention, and, Figs. 8 and 9 are plan views of the two faces of the product constructed in accordance with the process illustrated in Figs. 1 to 7.

These figures especially illustrate my improved process as adapted for use in making cog wheels and other objects where the details must be reproduced with great exactness.

Figure 1:
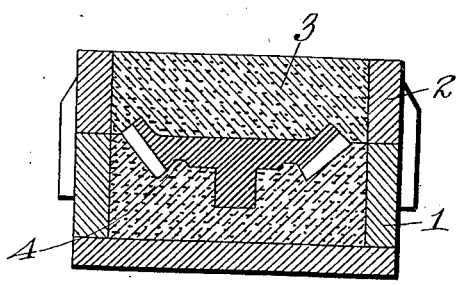

In Fig. 1 I have illustrated the drag 1 and the cope 2 in superimposed relation, having a filling of sand 3, which takes the impression of the pattern 4 inserted in the drag 1. The pattern 4 represents a bevel pinion projecting above the drag 1 from the rear angle of its teeth. An annular recess 5 is thus formed in the sand 3 of the cope 2 within which is a central portion 6 concentric therewith and flush with the surrounding material. The cope 2 having been thus treated is inverted and used as a drag in connection with a cope 7, having a composition filling 8.

Figure 2:
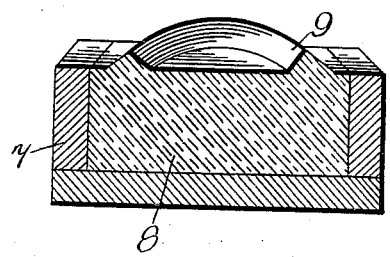

The cope 7 is illustrated in Fig. 2, and the filling 8, after being tamped into the recess 5, takes the surface form of an annular elevation or bead 9, conformable in shape to said recess. Then in like manner the cope 7 is used as a drag in connection with a cope 10, having a composition filling 11, which, being pressed upon the bead 9, has a surface formation of an annular groove or recess 12, within which is a concentric raised portion 13.

Figure 3:
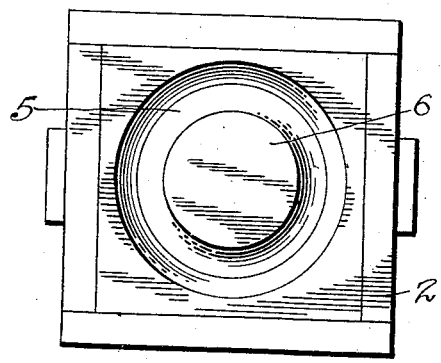
Figure 4:
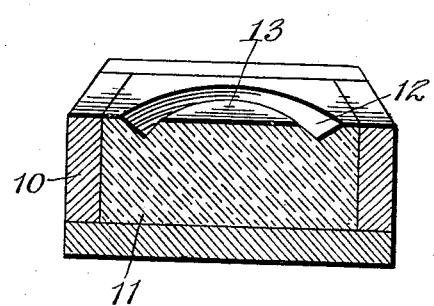
Figure 5:
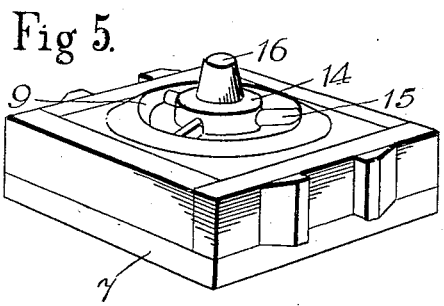

The cope 10 is illustrated in Fig. 4 and its material has the same impression as that of the cope 2, illustrated in Fig. 3. From the copes 7 and 10 the sand mold has its cope and drag formed. This step is illustrated in Figs. 5 and 6, showing the respective uses of the copes 7 and 10 which are now employed as drags. The impression of the rear surface of the pinion is made in negative from the cope 7. This is effected by placing within the space inclosed by the groove 9 a pattern 14, having the conformation of the rear side of the pinion to be molded, and being accordingly provided with ribs 15 and a boss 16. The original pattern 4 is placed with its rearwardly projecting portion in the recess 12 in the material of the cope 10. This step is shown in Fig. 6 and it is to be noted that the bevel teeth 17 on the front face of the pattern are exposed.

From the copes 7 and 10 with the patterns 14 and 4 respectively, therein I obtain the sand mold illustrated in Fig. 7. The drag 18 of the sand mold is made from the cope 10 and its material has the surface impression 19 in negative of the front face of the pattern 4. The sand mold cope 20 is formed from the cope 7 in the manner described, and its material has the impression 21 in negative of the projecting parts on the surface of the cope 7 and of the pattern 14 inclosed therein. The cope 20 is superimposed on the drag 18 and its material has an opening 22 therethrough, through which the metal to be shaped is introduced. The finished gear wheel is illustrated in Figs. 8 and 9, in which the front and rear faces respectively, as formed by the mold shown in Fig. 7, are illustrated.

The composition filling or material which I prefer to employ in making the forms or matrices used with the pattern sections for producing the drag and cope halves of the mold is that described in my Patent No. 785,562, dated March 21, 1905, and consists of sand, oil, litharge and asphaltum. After this material has received its impressing it is hardened by heating or drying, as fully described in my patent above mentioned.

While I have described my invention specifically, it is to be understood that said invention is not limited to the exact details mentioned, but may be variously modified within the scope of the appended claims.

Having thus fully described my invention, I claim:

1. The herein described process of producing molds which consists in forming in blocks of durable plastic material the positive and negative impressions of one side of a pattern, in then placing the said pattern conformable in said negatively impressed surface with its opposite side exposed, and finally in tamping plastic mold material upon said positively impressed surface, and upon said exposed side of said pattern, said mold material receiving negative impressions in its surface.

2. The herein described process of producing molds which consists in forming in blocks of durable plastic material the positive and negative impressions of one side of a pattern, in then placing the said pattern in said negatively impressed surface with its opposite side exposed, in placing upon said positively impressed surface a second pattern, and tamping plastic mold material upon said positively impressed surface and upon said pattern thereon, and upon said exposed side of said pattern, said mold material receiving negative impressions in its surface.

In testimony whereof I affix my signature in presence of two witnesses.

AARON R. MARSTELLER.

Witnesses:
　MYRON G. CLEAR,
　SIGMUND J. BLOCK.